United States Patent [19]
Komatsu et al.

[11] Patent Number: 5,119,449
[45] Date of Patent: Jun. 2, 1992

[54] OPTICAL DIRECTIONAL COUPLER SWITCH

[75] Inventors: Keiro Komatsu, Tokyo; Kunio Tada, Urawa; Hiroyasu Noguchi, Tagawa; Akira Suzuki, Tokyo, all of Japan

[73] Assignee: NEC Corporation, Tokyo, Japan

[21] Appl. No.: 486,448

[22] Filed: Feb. 28, 1990

[30] Foreign Application Priority Data

Feb. 28, 1989 [JP] Japan ................. 1-48861

[51] Int. Cl.⁵ ................................. G02B 6/10
[52] U.S. Cl. ............................. 385/8; 385/11; 385/4
[58] Field of Search ............ 350/96.12, 96.13, 96.14; 385/1, 2, 4, 8, 9, 10, 11, 3, 5, 6, 7

[56] References Cited

U.S. PATENT DOCUMENTS

| | | | |
|---|---|---|---|
| 4,685,763 | 8/1987 | Tada et al. | 350/96.14 |
| 4,711,515 | 12/1987 | Alferness | 350/96.14 |
| 4,837,526 | 6/1989 | Suzuki et al. | 350/96.14 X |
| 4,861,130 | 8/1989 | Katsuyama et al. | 350/96.14 |
| 4,884,858 | 12/1989 | Ushikubo et al. | 350/96.12 X |

Primary Examiner—Frank Gonzalez
Assistant Examiner—Phan T. Heartney
Attorney, Agent, or Firm—Sughrue, Mion, Zinn, Macpeak & Seas

[57] ABSTRACT

An optical directional coupler switch is fabricated from a semiconductor substrate having a (111) plane. Thus, refractive indexes are changed for TE and TM modes by electrooptic effect, although the change amount is different between TE and TM modes. Therefore, a switching operation is realized for an incident light having any polarization. A device length L is preferably set to meet an equation of "$L_{TE} \leq L \leq L_{TM}$" ($L_{TE}$ and $L_{TM}$ are coupling lengths for TE and TM modes) to decrease a cross-talk, even if the coupling lengths are different between TE and TM modes, considering that the difference is small.

3 Claims, 5 Drawing Sheets

OPTICAL DIRECTIONAL COUPLER SWITCH

FIELD OF THE INVENTION

This invention relates to an optical directional coupler switch, and more particularly to, an optical switch of a semiconductor type used in an optical communication system, an optical information processing system, and the like.

BACKGROUND OF THE INVENTION

An optical switch has been intensively researched and developed, because the optical switch has been considered to be a key element in high speed optical communication and information processing systems for the future. One type of the optical switch is fabricated from a dielectric material such as $LiNbO_3$, etc., and another type of the optical switch is fabricated from a semiconductor material such as GaAs, InP, etc., wherein the latter type has been expected to be used widely in the above systems, because it can be integrated with an optical device such as an optical amplifier, etc. and an electronic device such as an FET, etc., so that size can be small and the number of channels is increased in the systems. In this semiconductor optical switch, characteristics such as high speed operation, low power consumption operation, low voltge operation, low loss operation, feasibility for high integration, etc., are required to be applied to the systems.

Now, there have been fabricated and studied a total reflection type optical switch, in which a refractive index is changed in accordance with a band-filling effect or a free-carrier plasma effect by injecting current thereinto, a directional coupler type switch, in which a refractive index is changed in accordance with an electrooptic effect by applying an electric field thereto, and another total reflection type optical switch, in which a refractive index is changed in accordance with a shift of an exciton absorption peak by applying an electric field to a multi-quantum well therein.

Among these optical switches, the current injecting total reflection type has disadvantages in that operation speed is low, and electric power consumption is high, and the multi-quantum well total reflection type has a disadvantage in that a low loss structure is inherently difficult to be fabricated.

On the contrary, the directional coupler type switch utilizing an electrooptic effect has advantages in that high speed operation, low electric power consumption, and low loss operation are realized, although a device length is longer as compared to the total reflection type.

In regard to this low loss characteristic, a GaAs/AlGaAs optical waveguide having a loss as low as 0.15 dB/cm at a wavelength of 1.52 μm is described on pages 1628 to 1630 of "Appl. Phys, Lett. 50 (23), 8 June 1987," Such a low loss characteristics is realized in this optical waveguide, because bandgap wavelengths of GaAs and AlGaAS are positioned on a wavelength side which is sufficiently short as compared to 1.3 and 1.5 μm bands. Furthermore, the optical waveguide has an advantage in that a refractive index change does not differ from that in the vicinity of a bandgap, even if an operation wavelength is separated from the bandgap, because the electrooptic effect has a less wavelength dependency. For these reasons, the GaAs/AlGaAS optical waveguide is highly expected to be a material for a directional coupler type optical switch at a long wavelength band.

Although a directional coupler optical switch is as long as several mm in a device length, this can be small by utilizing a recently developed minute processing technology such as Molecular Beam Epitaxy (MBE), Reactive Ion Beam Etching (RIBE). etc. In this point, a small-sized optical directional coupler switch, in which a length is made to be 980 μm, that is, less than 1 mm by use of MBE and RIBE, is described on pages 1241 to 1243 of "Electronics Letters, 6th November 1986, Vol. 22, No. 23"

The small-sized optical directional coupler switch comprises an i-GaAs waveguide layer sandwiched by cladding layers of p-and n-AlGaAs and grown on a $n^+$-GaAS substrate of a (100) plane or a plane equivalent thereto, wherein the waveguide layer provides two parallel waveguides.

In operation, a switching operation is carried out by supplying an incident light of TE mode to one of the two waveguides. Here it is defined that a polarized waveguide light having an electric field component which is mainly parallel to layers of the switch is TE mode, while a polarized waveguide light having an electric field component which is mainly perpendicular to the layers is TM mode.

However, the small-sized optical directional coupler switch has a disadvantage in that a switching operation is not realized by an incident light of TM mode. Furthermore, a predetermined switching property is not obtained, where an incident light having a polarization changing in time is supplied to one of the two waveguides, even if a predetermined constant voltage is applied to the switch, because an output light power supplied from one of the two waveguides varies dependent on the change of the polarization.

In the past, a crystal orientation substrate of a (100) plane or a plane equivalent thereto has been studied for an optical semiconductor directional coupler switch utilizing electrooptic effect. However, crystal structures of GaAS and InP are isotropic for zincblende type structure. Therefore, a refractive index is changed in GaAs and InP only for a polarized light having an electric field component which is perpendicular to a direction of applied electric field, where a crystal orientation of (100) plane or a plane orthogonal thereto is utilized.

SUMMARY OF THE INVENTION

Accordingly, it is an object of this invention to provide an optical directional coupler switch, in which a switching operation is carried out for incident lights of TE and TM modes.

It is a further object of the invention to provide an optical directional coupler switch, in which an output light power is not changed, even if an incident light is changed in polarization.

According to the invention, an optical directional coupler switch, includes first and second semiconductor cladding layers, and a semiconductor waveguide layer sandwiched by the first and second semiconductor layers, successively grown on a semiconductor substrate of a (111) plane, wherein two three-dimensional optical waveguides which are provided to be proximate to each other. In the optical directional coupler switch, an electric field is applied independently to the two three-dimensional optical waveguides, and a device length L of an optical coupler meets the equation, $$L_{TE} \leq L \leq L_{TM}$$

where $L_{TE}$ and $L_{TM}$ are lengths which are necessary for TE mode and TM mode to transfer a waveguide light power from one of the two waveguides to the other completely.
dr

BRIEF DESCRIPTION OF THE DRAWINGS

This invention will be explained in more detail in conjunction with appended drawings, wherein.

DESCRIPTION OF THE PREFERRED EMBODIMENTS

Figure 1:
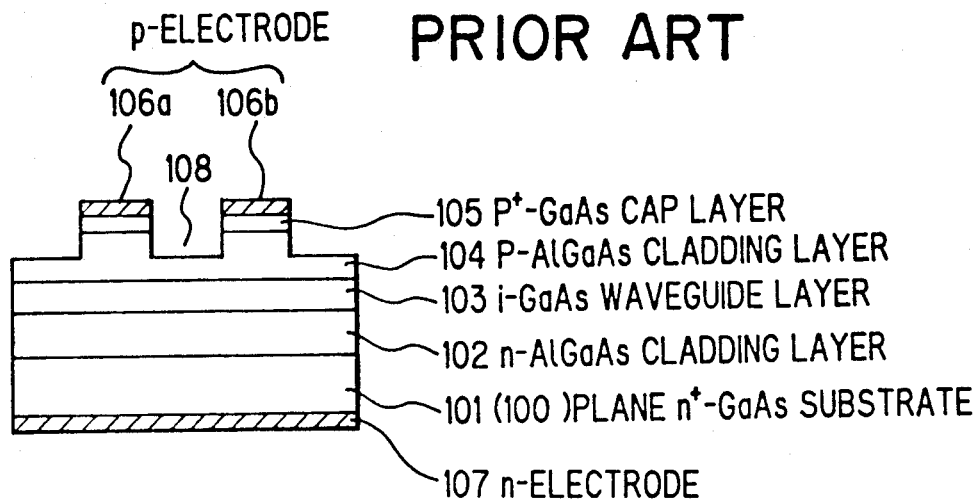
FIG. 1 is a cross-sectional view showing a conventional optical directional coupler switch.

Before explaining an optical directional coupler switch in a preferred embodiment according to the invention, the aforementioned small-sized optical directional coupler switch illustrated in FIG. 1 will be explained. The optical directional coupler switch comprises an $n^-$-GaAs substrate 101 of (100) plane, and an n-AlGaAs cladding layer 102, an i-GaAS waveguide layer 103, a p-AlGaAs cladding layer 104, and $p^+$-GaAs cap layers 105 which are separated by a groove 108, successively grown on the GaAS substrate 101. The optical directional coupler switch further comprises p-electrodes 106a and 106b provided on the respective cap layers 105, and an n-electrode 107 provided on the back surface of the $n^+$-GaAs substrate 101.

In operation, a predetermined voltage is applied independently across the p-and n-electrodes 106a and 107, and across the p-and n-electrodes 106b and 107, so that two parallel optical waveguides are provided in the i-GaAs waveguide layer 103. Detail of operation is not explained here. This will be apparent from the preferred embodiment.

Figure 2:
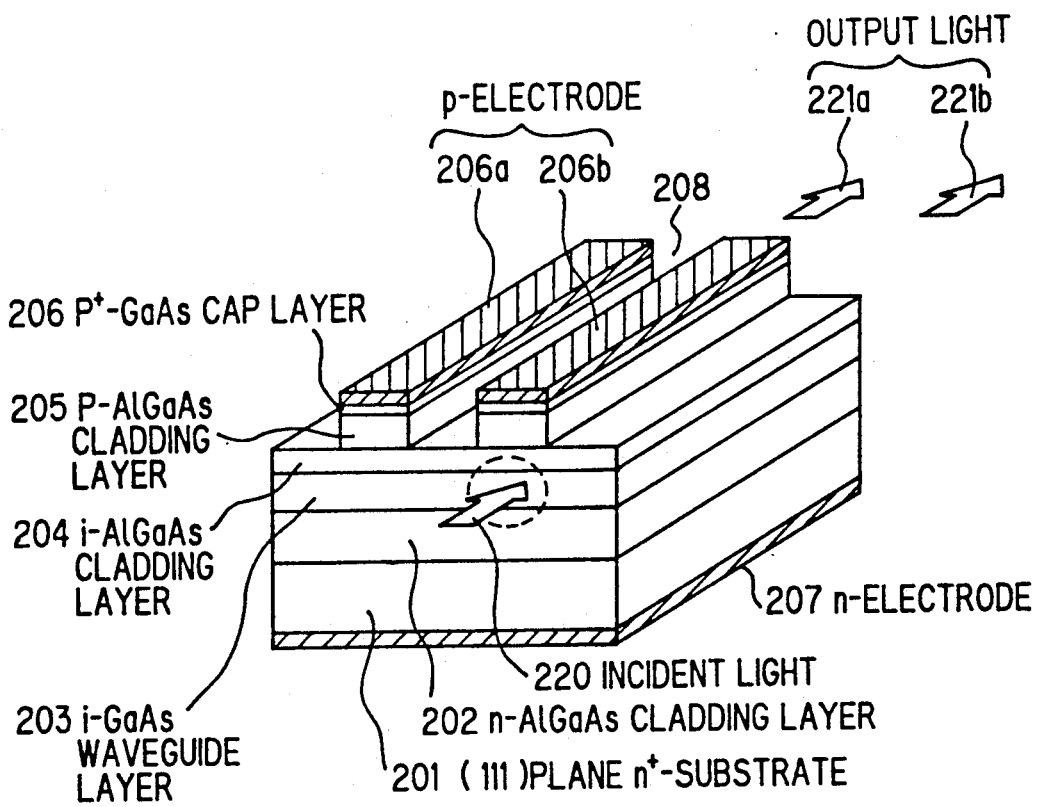
FIG. 2 is a perspective view showing an optical directional coupler switch in a preferred embodiment according to the invention.

In contrast, the present invention illustrated in FIG. 2 shows an optical directional coupler switch in the preferred embodiment which comprises an $n^{30}$-GaAs substrate 201 of (111) plane, and an n-AlGaAs cladding layer 202, an i-GaAs waveguide layer 203, an i-AlGaAs cladding layer 204, two striped p-AlGaAS cladding layers 205 and $p^+$-GaAs cap layers 206 which are separated by a groove 208, successively grown on the GaAs substrate 201. The optical directional coupler switch further comprises p-electrodes 206a and 206b provided on the top surfaces of the GaAs cap layers 206 and an n-electrode 207 provided on the back surface of the GaAs substrate 201.

Next, the fabrication process of the optical directional coupler switch in the preferred embodiment will be explained. At first, the n-AlGaAs cladding layer 202 having an Al composition ratio x of 0.5 and a thickness of approximately 1.5 μm, the i-GaAs waveguide layer 203 having a thickness of 0.2 μm, the i-AlGaAs cladding layer 204 having an Al composition ratio x of 0.5 and a thickness of 0.4 μm, the p-AlGaAs cladding layers 205 having an Al composition ratio x of 0.5 and a thickness of 0.6 μm, and the $p^+$-GaAs cap layers 206 having a thickness of 0.2 μm are grown on the GaAs substrate 201 by use of Molecular Beam Epitaxy. Secondly, a Ti/Au film which is a p-electrode material is evaporated on a total surface of the $p^+$-GaAs cap layers 206, and then processed to provide two striped patterns of the Ti/Au film, which are covered with photoresists, thereon by use of photolithography. Then, the $p^+$-GaAs cap layers 206 and the p-AlGaAs cladding layers 205 are etched except for portions corresponding to the two striped portions covered with the photoresists by use of Reactive Ion Beam Etching, such that an interface of the i-AlGaAs cladding layer 204 is exposed on the etched portions of the $p^+$-GaAs cap layers 206 and the p-AlGaAs cladding layers 205. Consequently, two rib type optical waveguides are obtained as shown in FIG. 2. Thereafter, the $n^+$-GaAs substrate 201 of (111) plane is polished, and then covered with AuGeNi/AuNi, which is an n-electrode material and is subject to an electrode alloy process, by evaporation thereof. At the final stage, cleaved facets are provided on both sides of the semiconductor element processed above, such that the optical directional coupler switch, which is of 2 mm in length, and is provided with the rib type optical waveguides each having a width of 2.5 μm and an spacing of 2.85 μm to the other, is fabricated as shown in FIG. 2.

Operating principle of the optical directional coupler switch thus fabricated will be explained. In a vertical direction of the layers of the optical directional coupler switch, a refractive index of the i-GaAs waveguide layer 203 is higher than those of the upper and lower cladding layers 202 and 204, so that a major portion of an incident light 220 is three-dimensionally confined in the i-GaAs waveguide layer 203, and transmitted therethrough along one of the stripped rib portions. When the light is transmitted through the corresponding optical waveguide by a predetermined distance, the transmitted light is completely coupled to the other optical waveguide, because the two optical waveguides are positioned in parallel with the small spacing of, for instance, 2.58 μm. The predetermined distance is generally defined as a coupling length which is dependent on a thickness of the waveguide layer 203, composition, a width of the waveguides, the spacing of the waveguides, and a waveguide formation condition, as well as a polarized condition of the incident light. This is because a configuration of the optical waveguides differs between horizontal and vertical directions in regard to the layers. This configuration effect occurs not only in utilizing a (111) substrate, but also in utilizing a (100) substrate.

Figure 3:
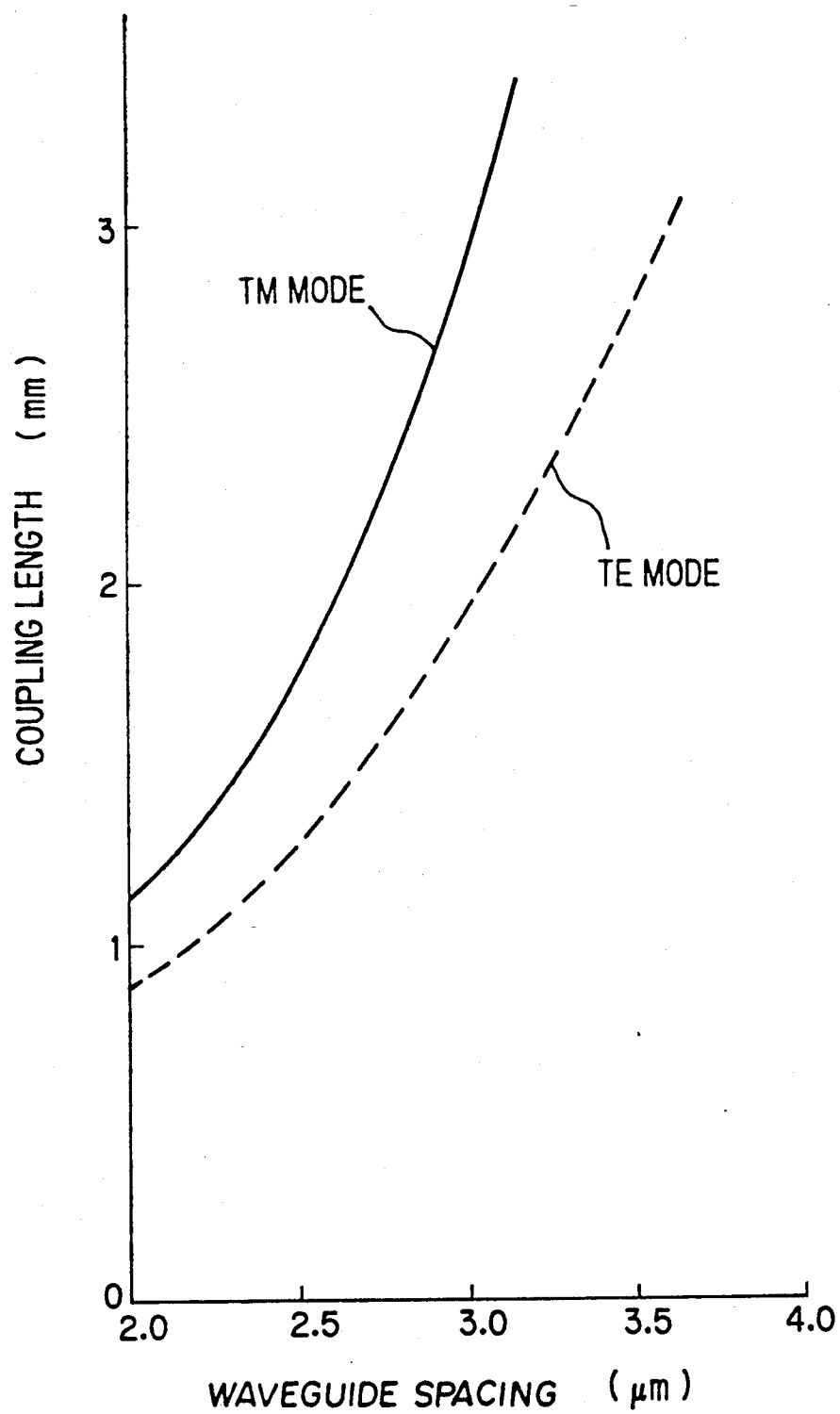
FIG. 3 is an explanatory diagram showing a coupling length relative to a spacing of optical waveguides in the preferred embodiment.

FIG. 3 shows an spacing dependency of two parallel waveguides for a coupling length in the optical directional coupler switch. As apparent in FIG. 3, a coupling length for TM mode is longer than that for TE mode, and the difference therebetween becomes large in proportional to the increase of the spacing. Practically, however, a coupling length $L_{TE}$ is 1.72 mm for TE mode, and a coupling length $L_{TM}$ is 2.46 mm for TM mode, where the spacing of the waveguides is 2.85 m. Therefore, the both coupling lengths $L_{TE}$ and $L_{TM}$ are values which are proximate to the device length of, for instance, 2 mm. Accordingly, where no voltage is applied across the p-electrodes 206a and 206b and the n-electrode 207, an incident light for the both TE and TM modes is completely coupled from one of the waveguides to the other on the light output side thereof. That is, a cross state of ⊗ is realized in the optical directional coupler switch. In this state, a cross-talk CT is calculated in the following equation.

$$CT = 10 \times \log \{P_1/(P_1 + P_2)\}$$

where
$P_1 = \cos^2(\pi L/2L_0)$, and
$P_2 = \sin^2(\pi L/2L_0)$ provided that L is a device length, and $L_0$ is a coupling length $L_{TE}$ for TE mode, and a coupling length $L_{TM}$ for TM mode.

In the preferred embodiment, a cross-talk CT is less than $-10$ dB in any case of TE mode and TM mode, because the device length L is set to be larger and equal to $L_{TE}$ and smaller and equal to $L_{TM}$ ($L_{TE} \leq L \leq L_{TM}$). The above explanation is for a case in which no voltage is applied across the electrodes.

On the other hand, where a reverse bias voltage is applied across one of the p-electrodes 206a and 206b and the n-electrode 207, refractive indexes of the i-GaAs waveguide layer 203 and the i-AlGaAs cladding layer 204 are changed by electrooptic effect. In using a GaAs substrate of (100) plane, a refractive index is changed for TE mode by electrooptic effect, and not thereby changed for TM mode, because GaAs is of a zincblende structure crystal, as described before. Therefore, a TE mode incident light supplied to one of the two waveguides is not coupled to the other waveguide, where a phase difference is $\sqrt{3}\pi$ between the two waveguides in accordance with an application of an appropriate reverse bias voltage. That is, a bar state of ⊖ is realized. On the other hand, no phase difference occurs between the two waveguides for a TM mode incident light even if any voltage is applied to the optical directional coupler switch. Therefore, the bar state of ⊖ is not realized between the two waveguides, while the cross state of ⊗ is maintained. This means that a polarization dependency occurs in a switching operation, where a (100) crystal orientation is utilized for a substrate.

In the preferred embodiment, a refractive index is changed for TE and TM modes by electrooptic effect, because a (111) crystal orientation is utilized. In fact, the changes of refractive indexes $\Delta n_{TE}$ for TE mode and $\Delta n_{TM}$ for TM mode are obtained as follows.

$$\Delta n_{TE} = (1/2 \sqrt{3}) N_{eff}^3 r_{41} E$$

$$\Delta n_{TM} = (1/\sqrt{3}) N_{eff}^3 r_{41} E$$

where
$N_{eff}$ is an effective refractive index of the waveguides,
$r_{41}$ is an electrooptic coefficient of GaAs which is $1.5 \times 10^{-12}$ m/V, and E is an electric field strength.

From the above equations, it is understood that the refractive index change $\Delta n_{TM}$ is twice the refractive index change $\Delta n_{TE}$. Thus, although degrees in the changes of refractive indexes are different between the two modes, the bar state of ⊖ is realized even for TM mode, where the optical directional coupler switch is driven by a reverse bias voltage, by which the bar state of ⊖ is realized for TE mode. This will be explained in conjuction with FIG. 4.

Figure 4:
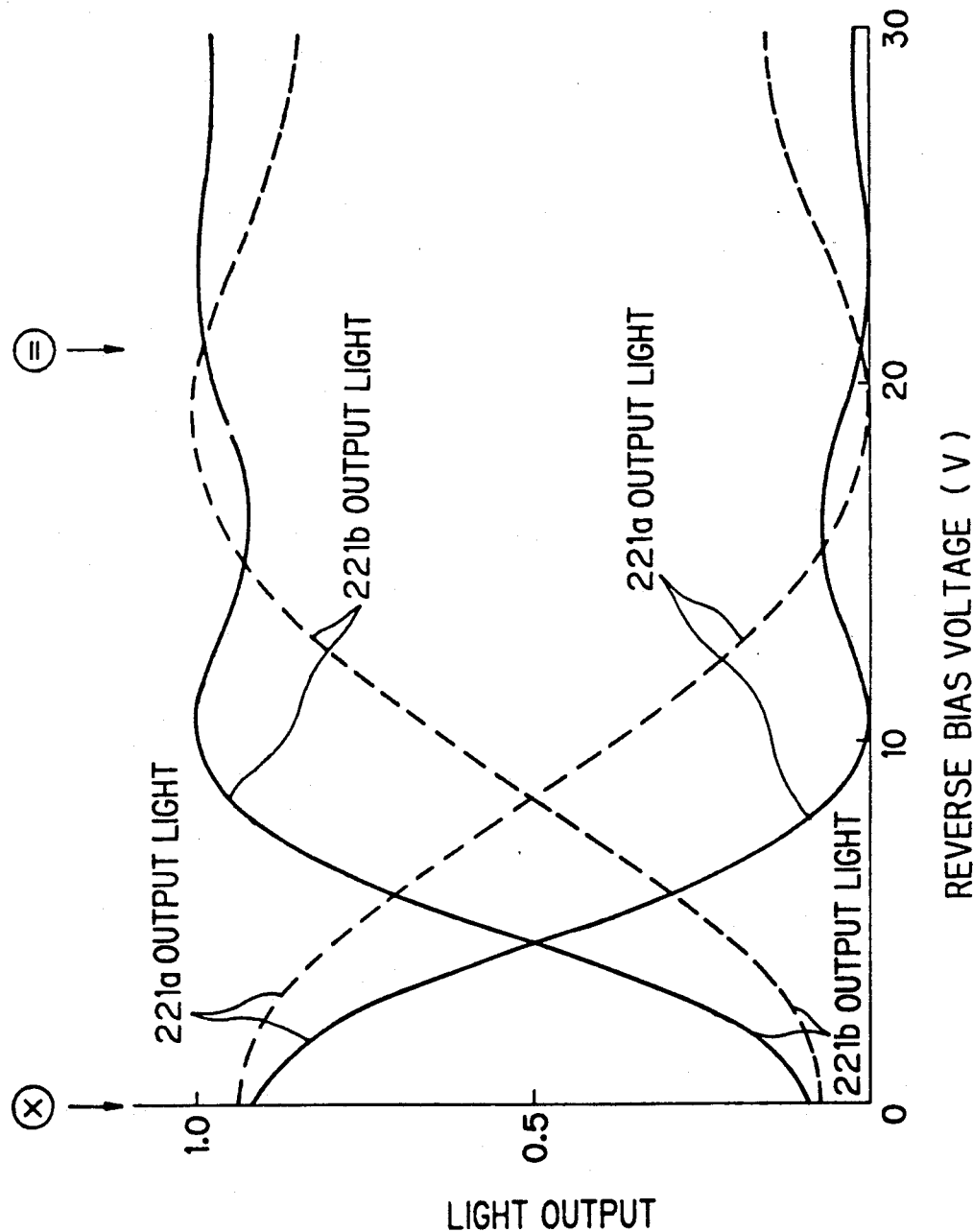
FIG. 4 is an explanatory diagram showing switching characteristics in the preferred embodiment.

FIG. 4 shows switching characteristics, by which an incident light 220 supplied to the waveguide corresponding to the p-electrode 206b of the optical directional coupler switch is switched between the two waveguides to provide an output light 221a or 221b as shown in FIG. 2, wherein solid lines indicate a switching characteristic for TM mode, and broken lines indicate that for TE mode. In these characteristics, where a reverse bias voltage is 0V, the incident light 220 supplied to the waveguide corresponding to the p-electrode 206b is supplied as the output light 221a from the waveguide corresponding to the p-electrode 206a, thereby providing the cross state of ⊗. On the other hand, where the reverse bias voltage is increased, a refractive index change $\Delta n_{TM}$ becomes larger than a refractive index change $\Delta n_{TE}$, so that the bar state of ⊖ is realized for TM mode by a lower voltage than for TE mode. Therefore, if a reverse bias voltage for realizing the bar state of ⊖ is determined in advance to be a specific voltage between 15 V and 24 V, for instance, 21 V, the bar state of ⊖ is realized for TE mode and TM mode with a cross-talk less than $-10$ dB by applying the specific voltage to the optical directional coupler switch. Accordingly, an optical directional coupler switch is obtained in the invention, wherein the cross and bar states of ⊗ and ⊖ are realized without the dependency of a polarization for an incident light by controlling the reverse bias voltage to be 0 V and the specific voltage of, for instance, 21 V, because a (111) crystal orientation is utilized for a seimconductor substrate.

The above operating principle of an optical directional coupler switch according to the invention has been confirmed in an experiment described below.

Figure 5:
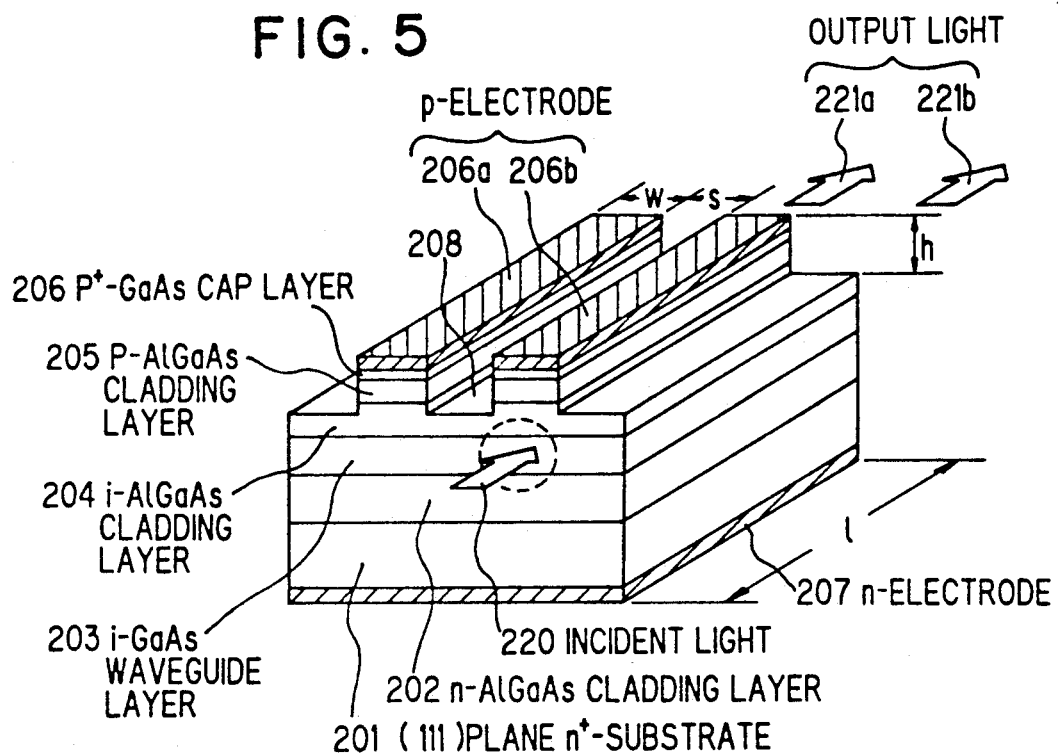
FIG. 5 is a perspective view showing an optical directional coupler switch which is fabricated in confirming a switching operation in the preferred embodiment.

In the experiment, an optical directional coupler switch as shown in FIG. 5 is used, wherein like parts are indicated by like reference numerals as used in FIG. 2. The optical directional coupler switch comprises a (111) plane $n^+$ -GaAs substrate 201, and n-AlGaAs cladding layer 202 having an Al composition x of 0.5 and a thickness of 1.5 µm, an i-GaAs waveguide layer 203 having a thickness of 0.2 82 m, an i-AlGaAs cladding layer 204 having an Al composiiton ratio x of 0.5 and a thickness of 0.4 µm, a p-AlGaAs cladding layer 205 having an Al composition ratio x of 0.5 and a thickness of 0.6 µm, and a p+-GaAs cap layer 206 having a thickness of 0.2 µm. In conductive layers of the optical directional coupler switch, doping concentrations are $5 \times 10^{17}$ cm$^{-3}$ for the n-AlGaAs cladding layer 202, $5 \times 10^{17}$ cm$^{-3}$ for the p-AlGaAS cladding layer 205, and $2 \times 10^{18}$ cm$^{-3}$ for the p30 -GaAs cap layer 206, respectively. Furthermore, a width W of the waveguides is 3.5 µm, an etching depth, that is, a height h of the ribs is 0.9 µm, a device length l is 2.5 mm, and an spacing s of the waveguides is 2 µm.

Figure 6:
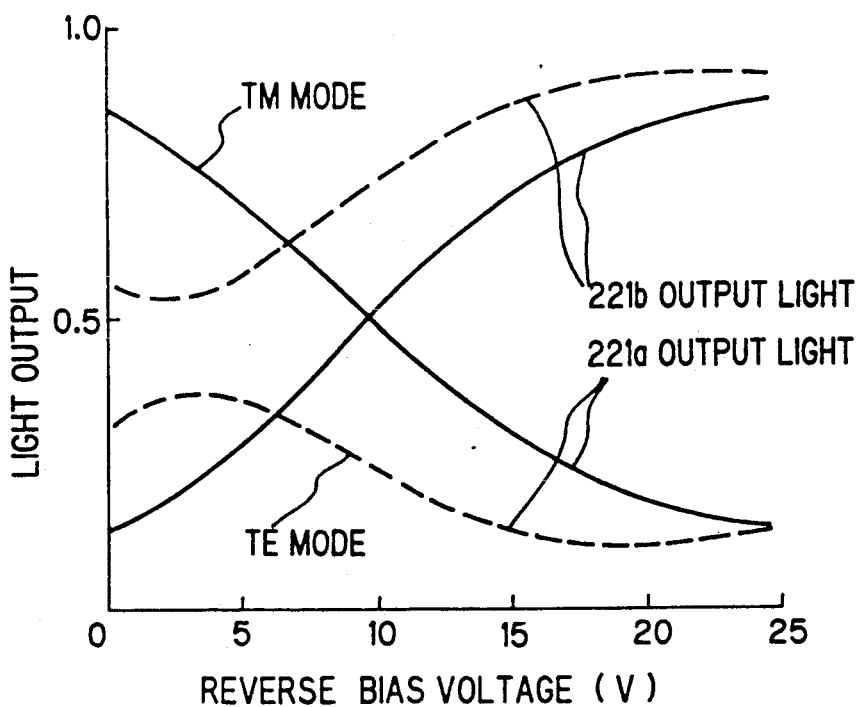
FIGS. 6 and 7 are explanatory diagrams showing switching characteristics of the optical directional coupler switch which is fabricated in FIG. 5.

In this optical directional coupler switch, an incident light 220 having a wavelength of 1.3 m is supplied to one of the waveguides thereof, and results are obtained as shown in FIG. 6, wherein solid lines are for TM mode, and broken line are for TE mode. As apparent in FIG. 6, a switching operation is realized for TM mode incident light. From this result, it is confirmed that a refractive index is changed for TM mode by electrooptic effect, where a (111) crystal orientation is utilized for a semiconductor substrate. However, a switching operation is not realized for TE mode, although a refractive index is changed, because a coupling length is too short, as compared to the device length of 2.5 mm.

Figure 7:
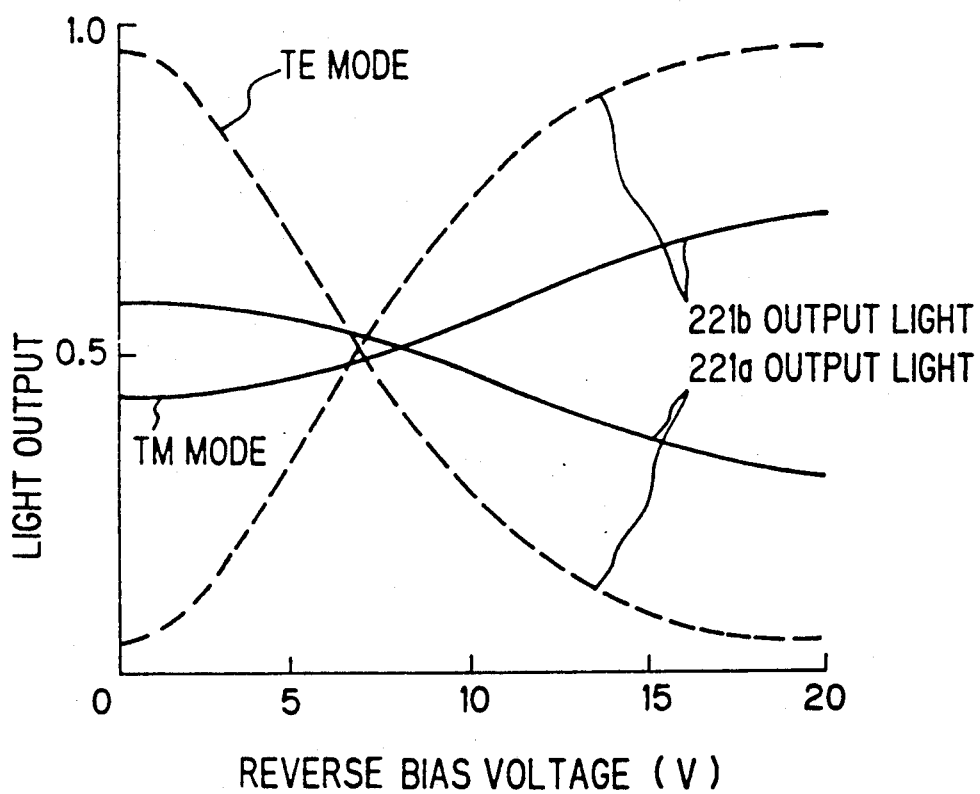

On the other hand, FIG. 7 shows switching characteristics which are measured in an optical directional coupler switch, in which the structure is the same as that in FIG. 6, except that a spacing s of the waveguides is 2.5 μm. In this structure, a predetermined switching result is obtained for TE mode, because a coupling length is approximately equal to the device length of 2.5 mm. On the other hand, a complete switching operation is not realized for TM mode, although refractive indexes are changed by electrooptic effect, because a coupling length is longer than the device length.

In the experiment for confirming the operating principle as described above, it is confirmed that, although a switching operation is not realized for an incident light having an arbitrary polarization in a single optical directional coupler switch in the inveniton, refractive indexes are changed in the use of (111) crystal orientation for TE mode and TM mode by electrooptic effect, thereby verifying the effectivenes of the invention.

In the above experiment, the reason why a switching operation is not realized for an incident light having an arbitrary polarization in a single optical directional coupler switch is that coupling lengths for TE mode and TM mode are not appropriately matched with a device length, the waveguide width, the waveguide interval, the etching depth (the rib height), etc. of the optical directional coupler switch which was actually fabricated are different from designed value described in the aforementioned preferred embodiment. Therefore, an optical directional coupler switch having predetermined switching characteristics for an incident light having an arbitrary polarization can be realized, where the optical directional coupler switch is fabricated to have designed values.

Accordingly, an optical directional coupler switch which is not dependent on a polarization of an incident light can be realized in the invention. Therefore, the optical directional coupler switch is widely applied to an optical communication system, an optical information processing system, etc., in which predetermined switching characteristics are required for an incident light having a polarization to be changed from time to time such as a transmitting light of a single mode optical fiber.

In the preferred embodiment, although a GaAs system material is used, other materials such as an InP system material may be used. Furthermore, other waveguide structures such as a buried type waveguide may be used in place of the rib type waveguide.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. In an optical directional coupler switch including a first semiconductor cladding layer, a semiconductor waveguide layer, and a second semiconductor cladding layer successively grown on a semiconductor substrate, the improvement comprising:
   means for providing two three-dimensional optical waveguides on said semiconductor substrate, said optical waveguides being proximate in parallel; and
   means for applying electric fields to said optical waveguides independently;
   wherein said semiconductor substrate is of a (111) plane.

2. In an optical directional coupler switch including a first semiconductor cladding layer, a semiconductor waveguide layer, and a second semiconductor cladding layer successively grown on a semiconductor substrate, the improvement comprising:
   means for providing two three-dimensional optical waveguides on said semiconductor substrate, the three-dimensional optical waveguides being proximate in parallel; and
   means for applying electric fields to said optical waveguides independently;
   wherein said semiconductor substrate is of a (111) plane;
   wherein said optical directional coupler switch has a device length L, the device length L meets an equation, $$L_{TE} \leq L \leq L_{TM}.$$

where $L_{TE}$ and $L_{TM}$ are lengths necessary for transferring a light power from one of said two optical waveguides to the other completely in TE mode and TM mode, respectively.

3. In an optical directional coupler switch including a first semiconductor cladding layer, a semiconductor waveguide layer, and a second semiconductor cladding layer successively grown on a semiconductor substrate, the improvement comprising:
   means for providing two three-dimensional optical waveguides on said semiconductor substrate, said optical waveguides being proximate in parallel; and
   means for applying electric fields to said optical waveguides independently;
   wherein said semiconductor substrate is of a (111) plane;
   wherein said optical directional coupler switch has a device length L, the device length L meets and equation, $$0.86 L_{TE} \leq L \leq 1.23 L_{TM},$$

wherein $L_{TE}$ and $L_{TM}$ are lengths necessary for transferring a light power from one of the two three-dimensional optical waveguides to the other completely in TE mode and TM mode, respectively.

* * * * *